US009588662B2

(12) United States Patent
Sood et al.

(10) Patent No.: US 9,588,662 B2
(45) Date of Patent: Mar. 7, 2017

(54) DATA RESEARCH AND RISK MANAGEMENT ASSESSMENT APPLICATION

(71) Applicant: Bank of America Corporation, Charlotte, NC (US)

(72) Inventors: Vikram Sood, Haryana (IN); Jasmit Singh Lamba, Delhi (IN); Pankaj Bhandari, Delhi (IN); Arunesh Sharma, Haryana (IN); Amanda Jane Wright, Chesterfield, VA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 293 days.

(21) Appl. No.: 14/448,831

(22) Filed: Jul. 31, 2014

(65) Prior Publication Data
US 2016/0034518 A1 Feb. 4, 2016

(51) Int. Cl.
*G06F 17/00* (2006.01)
*G06F 7/00* (2006.01)
*G06F 3/0484* (2013.01)
*G06F 17/30* (2006.01)

(52) U.S. Cl.
CPC .... *G06F 3/04842* (2013.01); *G06F 17/30569* (2013.01)

(58) Field of Classification Search
CPC ............. G06F 17/30371; G06F 3/0482; G06F 3/04842; G06F 17/30864
USPC ....................................................... 707/690
See application file for complete search history.

(56) References Cited

U.S. PATENT DOCUMENTS

| | | | | |
|---|---|---|---|---|
| 7,856,428 B2* | 12/2010 | Steinmann | ........ | G06F 17/30486 707/705 |
| 8,200,527 B1* | 6/2012 | Thompson | ......... | G06Q 10/0639 705/7.38 |
| 8,943,076 B2* | 1/2015 | Stewart | .................. | G06Q 10/06 707/755 |
| 9,092,575 B2* | 7/2015 | Koenig | ............... | G06F 11/3668 |
| 2002/0038273 A1* | 3/2002 | Wherry | .................. | G06Q 40/04 705/36 R |
| 2002/0046394 A1* | 4/2002 | Do | ........................... | G06F 8/20 7/108 |
| 2005/0237268 A1* | 10/2005 | Steinmann | ............ | G06F 9/4443 345/1.1 |
| 2006/0253466 A1* | 11/2006 | Upton, IV | ........ | G06F 17/30398 707/999.1 |
| 2007/0250304 A1* | 10/2007 | Elfner | ................... | G06F 9/4443 703/27 |

(Continued)

*Primary Examiner* — Pavan Mamillapalli
(74) *Attorney, Agent, or Firm* — Michael A. Springs; Moore & Van Allen PLLC; James C. Edwards

(57) ABSTRACT

Systems, apparatus, and computer program products provide for a comprehensive platform in which users can gain access to data mapping and linkage information associated with multiple data sources, data systems, databases within the systems and the like. As such, the platform provides for time-efficient and reliable data management and research which aids the user in comprehending the connections between data from different data sources and included within different data systems, and the downstream impact (i.e., the impact of the data on other data fields) and upstream data source(s) (i.e., the secondary data fields used to calculate the data filed) of such data.

20 Claims, 13 Drawing Sheets

(56) References Cited

U.S. PATENT DOCUMENTS

2010/0042451 A1* 2/2010 Howell ............... G06F 11/008
  705/7.28

* cited by examiner

| | L | M | N | O | P | |
|---|---|---|---|---|---|---|
| | 514 | 516 | 518 | DATA MANIPULATION 520 | 522 | 524 |
| 1 | | | | | | |
| 2 | VALUE BOUNDARIES (MAX) | REQUIRED? | DATA TRANSFORMED | TRANSFORMATION DETAILS/LOGIC (IF APPLICABLE) | WHEN DOES THE TRANSFORMATION HAPPEN? | REFERENCE DATA FILTER |
| 3 | | YES | YES | | | |
| 4 | | YES | YES | | | |
| 5 | | YES | YES | | | |
| 6 | | YES | YES | | | |
| 7 | | YES | YES | | | |
| 8 | | YES | YES | | | |
| 9 | | YES | YES | | | |
| 10 | | YES | YES | | | |
| 11 | | YES | YES | | | |
| 12 | | YES | YES | | | |
| 13 | | YES | YES | | | |
| 14 | | YES | YES | | | |

FIG. 7C

| | O 520 | P 522 | Q 524 | R 528 | S 530 | T 532 |
|---|---|---|---|---|---|---|
| 1 | DATA MANIPULATION | | | | | |
| 2 | TRANSFORMATION DETAILS/LOGIC (IF APPLICABLE) | WHEN DOES THE TRANSFORMATION HAPPEN? | REFERENCE DATA SOR USED FOR AGGREGATION DATA FILTER OR TRANSFORMATION LOGIC | DATA OBFUSCATED Y/N, HOW? | PROFIT DATA TYPE | UNDERLYING AIT |
| 3 | | | | | INTEGER(10) | 1785 |
| 4 | | | | | INTEGER(10) | 1785 |
| 5 | | | | | DATE(10) | 1785 |
| 6 | | | | | DATE(10) | 1785 |
| 7 | | | | | VARCHAR(7) | 16927 |
| 8 | | | | | CHAR(2) | 1785 |
| 9 | | | | | CHAR(2) | 1785 |
| 10 | | | | | CHAR(19) | 7379 |
| 11 | | | | | CHAR(19) | 7379 |
| 12 | | | | | CHAR(19) | 7379 |
| 13 | | | | | CHAR(16) | 7379 |
| 14 | | | | | VARCHAR(19) | 1785 |

FIG. 7D

EXTENDED SEARCH

602 — CHOOSE YOUR OPTION: [CONTAINS ▼]
ENTER THE CHARACTER: [AVG] — 604
GO TO HOME PAGE — 618
RESET — 616

SEARCH — 606

DATA SYSTEM NO. 1 FIELD NAME:
- ACC_AVG_CLCT_BAL_AM
- ACC_AVG_CST_FLT_AM
- AVG_DLY_BAL_FIX_AM
- AVG_DLY_BAL_VAR_AM
- AVG_INVSTM_BAL_AM
- AVG_LDGR_BL_PARTP_AM

— 608

DATA SYSTEM NO. 2 FIELD NAME:
- ACCOUNT AVG COLL BAL
- AVG BAL FIX [CVPM]
- AVG BAL FIX RETAIL
- AVG BAL FIX S CASH
- AVG BAL FIXED CASH
- AVG BAL FIXED OTHER

— 610

DATA SYSTEM NO. 3 FIELD NAME:
- AVG_BL_LN_AM
- AVG_CLCT_BL_AM
- AVG_FLT_BL_AM
- AVG_INV_BL_AM
- AVG_NEG_FLT_BL_AM
- AVG_OPN_BL_AM

— 612

SOURCE FIELD NAME:
- ACC_AVG_BL_AM
- ACC_AVG_OS_LN_BL
- MID_AVG_BALANCE_AMT_USD
- ACC_AVG_ACC_BL
- ACC_AVG_BL_AM
- ACC_AVG_CST_FLT_AM

DATA RESEARCH AND RISK MANAGEMENT ASSESSMENT APPLICATION

FIELD

In general, embodiments of the invention relate to data management and, more particularly, a data research and risk management application that is configured to facilitate research and data validation by linking data fields from disparate data sources and providing upstream data source(s) (i.e., the secondary data fields used to calculate the data) and downstream data field impact (i.e., the use/impact of the data field in calculating other data fields).

BACKGROUND

In large enterprise businesses, such as a financial institution having offices and branches located worldwide, data management and validation can be a daunting task, since the data originates from various sources and is implementing in various systems. For example, the enterprise may have multiple divisions, entities, product lines and the like, each with their own systems of record, data sources/extracts, databases and the like.

In instances in which an enterprise/large business has disparate systems of record, data sources/extracts, databases and the like, data research and validation becomes a time consuming and inefficient task because information is stored at various locations and users have to access various systems, documents and the like to perform such data research and/or validation tasks. Thus, the ability to readily generate reports, such as reports that map data fields from different data sources and the like, is severely impacted.

Moreover, data analysis and searching becomes problematic because a data field originating from one data source or stored in one data system/database may have a different label/name when originating from another data source or when stored in another data system/database. In addition, the manual aspect of such data analysis and validation is unreliable since the resulting mapping of data fields from table-to-table, database-to-database and the like is prone to human error/inaccuracies.

In the financial institution scenario, when undertaking a data research activity it is important to understand and validate data connections across all systems and applications. The absence of systematic information on data lineage and mapping results in difficulty in validating calculation logic and, as such, the downstream impact on validation of balance sheets and income statements is negatively affected.

Therefore, a need exists to develop systems, apparatus, computer program products, methods and the like that facilitates data research and validation amongst disparate data systems, data sources and the like. The desired systems, apparatus and the like should provide the requisite linkage and/or mapping of data fields from amongst multiple data sources and/or data systems. In addition, a need exists to provide such linkage and mapping information in a comprehensive platform that is easily accessible, user-friendly and provides flexibility and efficiency in generating reports using information from multiple different data sources, databases, tables and the like. Moreover, the desired systems, apparatus and the like should provide the ability to readily analyze questions and issues surrounding data by providing upstream data source(s) (i.e., the secondary data fields used to calculate a selected data field), downstream data impact (i.e., where is the data used in calculating other data fields) and the business rules impacted by the data.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatus, systems, computer program products, methods or the like for a comprehensive platform which users can gain access to data mapping and linkage information associated with multiple data sources, data systems, databases within the systems and the like. As such, embodiments of the present invention provide a time-efficient tool/application that aids the user in comprehending the connections between data from different data sources and included within different data systems and the downstream impact and upstream data sources(s) of such data.

Additionally, embodiments of the present invention reduce risk by adding reliability to the data validation process by presenting the calculation logic associated with each relevant data field in all data systems, databases, tables and the like. Data research can be performed efficiently and the cascading impact of data field assessed in a timely fashion through access to both the upstream data sources (i.e., where a data field originates or is derived from) and the downstream (i.e., where a data field is used for calculating other data fields) impact of the data.

In addition, embodiments of the present invention provide a data management tool/application that is configured to provide multiple report options, for example, mapping current data source information with proposed data source information.

An apparatus for presenting display of data mapping information between multiple data systems defines first embodiments of the invention. The apparatus includes a computing platform having a memory and at least one processor in communication with the memory. The apparatus further includes a data research and risk management application that is stored in the memory and executable by the processor. The application is configured to receive a first user-input at a first user-interface that selects a data model from amongst a plurality of data models and, in response to receiving the first user-input, provide selectable display in the first user-interface of one or more data extracts associated with the selected data model. In addition, the application is configured to receive a second user-input that selects one of the data extracts, and, in response to receiving the second user-input, provide selectable display in the first user-interface of one or more databases associated with the selected data extract. Further, the application is configured to receive a third user-input that selects one of the databases, and, in response to receiving the third-user input, provide selectable display in the first user-interface of one or more data fields associated with the selected data base.

Moreover, the application is configured to receive a fourth user-input that selects one of the data field and receive a fifth user-input that selects a search option. In response to receiving the fifth user-input, the application is configured to determine data mapping information for the selected data field and display in the first user-interface the data mapping information. The data mapping information includes at least one table location for the selected data field in other data systems (i.e., databases) and at least one data field name for the selected data field in the other data systems.

In specific embodiments of the apparatus, the data research and risk management application is further configured to determine the data mapping information for the selected data field and display the data mapping information, such that the data mapping information includes a data type for the data field name in the other data systems and a data field description for the data field name in the other data system. Moreover, in other specific embodiments of the invention, the data mapping information that is displayed may include transformation type required to transform the selected data field to the data field name in the other data system. The transformation type includes one of no transformation required (i.e., straight movement) or derivation logic required to transform the selected data field to the data field name in the other data system.

In other specific embodiments the application is configured to provide additional data management functionality. For example, in specific embodiments of the apparatus, the data research and risk management application is further configured to receive a sixth user-input at a second user-interface that selects a data model from amongst a plurality of data models, and, in response to receiving the sixth user-input, provide selectable display in the second user-interface of one or more data fields associated with the selected data model. In such embodiments of the apparatus, the application is further configured to receive a seventh user-input that selects a search option, and, in response to receiving the seventh user-input, determine upstream data source and downstream database impact of the selected data field and provide display in the second user-interface of the upstream data source and downstream database impact. In such embodiments of the apparatus, the upstream data source includes one or more data field used to calculate the selected data field and a calculation for deriving each of the one or more data fields and the downstream database impact includes one or more secondary data fields impacted by the selected data field. Moreover, in further related embodiments of the apparatus, the application may be configured to receive an eighth user-input that selects one of the secondary data fields and receive a ninth user-input that requests downstream database impact of the secondary data field. In response to receiving the ninth user-input, the application is configured to determine downstream database impact of the secondary data field, which includes one or more tertiary data fields impacted by secondary data field.

In other specific embodiments of the apparatus, the data research and risk management application is further configured to receive a sixth user-input at a second user-interface that selects a data source and receive a seventh user-input at the second user-interface that requests a report for the selected data source. In response to receiving the seventh user-input, the application is configured to generate and present the report in a third user-interface. The report includes a listing of data fields, upstream data source associated with each data field and data field transformation information for each data field.

In still further specific embodiments of the apparatus, the data research and risk management application is further configured to receive a sixth user-input at a second user-interface that selects search character criteria, a seventh user-input that defines search characters, and an eighth user-input that requests data field search. In response to receiving the eighth user-input, the application is further configured to determine data fields that meet the search character criteria and the defined search characters and provide display in the second user-interface of the data fields that meet the search character criteria and the defined search. The data fields are displayed according to an associated database.

Moreover, in further embodiments of the apparatus, the data research and risk management application is configured to receive a sixth user-input at a second user-interface that selects a database, and, in response to receiving the sixth user-input, provide selectable display in the second of a plurality of data fields associated with the selected database. The application is further configured to receive a seventh user-input that selects one of the data fields associated with the selected database and receive an eighth user-input that requests data extracts and tables associated with the selected data field. In response to receiving the eighth user-input, the application is configured to determine and provide display in the second-user-interface of data extracts and tables using the selected data field. The data extracts and tables are displayed according to data model.

A computer program product including a non-transitory computer-readable medium defines second embodiments of the invention. The computer-readable medium includes a first set of codes for causing a computer to receive a first user-input at a first user-interface that selects a data model from amongst a plurality of data models and a second set of codes for causing a computer to, in response to receiving the first user-input, provide selectable display in the first user-interface of one or more data extracts associated with the selected data model. The computer-readable medium additionally includes a third set of codes for causing a computer to receive a second user-input that selects one of the data extracts and a fourth set of codes for causing a computer to, in response to receiving the second user-input, provide selectable display in the first user-interface of one or more databases associated with the selected data extract. Additionally, the computer-readable medium includes a fifth set of codes for causing a computer to receive a third user-input that selects one of the databases and a sixth set of codes for causing a computer to, in response to receiving the third-user input, provide selectable display in the first user-interface of one or more data fields associated with the selected data base. Moreover, the computer-readable medium includes a seventh set of codes for causing a computer to receive a fourth user-input that selects one of the data field and an eighth set of codes for causing a computer to receive a fifth user-input that selects a search option. Lastly, the computer-readable medium includes a ninth set of codes for causing a computer to, in response to receiving the fifth user-input, determine data mapping information for the selected data field and display in the first user-interface the data mapping information, such that the data mapping information includes at least one table location for the selected data field in other data systems and at least one data field name for the selected data field in the other data systems.

In specific embodiments of the computer program product, the ninth set of codes is further configured to cause the computer to determine the data mapping information for the selected data field and display the data mapping information, including a data type for the data field name in the other data systems and a data field description for the data field name in the other data system. While in other embodiments of the computer program product, the data mapping information that is displayed includes transformation type required to transform the selected data field to the data field name in the other data system. The transformation type includes one of no transformation required or derivation logic required to transform the selected data field to the data field name in the other data system.

In additional specific embodiments of the computer program product, the computer-readable medium includes a tenth set of codes for causing a computer to receive a sixth user-input at a second user-interface that selects a data model from amongst a plurality of data models and an eleventh set of codes for causing a computer to, in response to receiving the sixth user-input, provide selectable display in the second user-interface of one or more data fields associated with the selected data model. Additionally the computer-readable medium includes a twelfth set of codes for causing a computer to receive a seventh user-input that selects a search option and a thirteenth set of codes for causing a computer to, in response to receiving the seventh user-input, determine upstream data source and downstream database impact of the selected data field and provide display in the second user-interface of the upstream data source and downstream database impact. In specific embodiments, the upstream data source includes one or more data field used to calculate the selected data field and a calculation for deriving each of the one or more data fields and the downstream database impact includes one or more secondary data fields impacted by selected data field (i.e., the selected data field is used to calculate the secondary data field). In such embodiments of the invention, the computer-readable medium may include a fourteenth set of codes for causing a computer to receive an eighth user-input that selects one of the secondary data fields, a fifteenth set of codes for causing a computer to receive a ninth user-input that requests downstream database impact of the secondary data field, and a sixteenth set of codes for causing a computer to, in response to receiving the ninth user-input, determine downstream database impact of the secondary data field including one or more tertiary data fields impacted by the secondary data field (i.e., the secondary data field is used to calculate the tertiary data field).

In still further specific embodiments of the computer program product, the computer-readable medium includes a tenth set of codes for causing a computer to receive a sixth user-input at a second user-interface that selects a data source and an eleventh set of codes for causing a computer to receive a seventh user-input at the second user-interface that requests a report for the selected data source. Further, the computer-readable medium includes a twelfth set of codes for causing a computer to, in response to receiving the seventh user-input, generate and present the report in a third user-interface. The report includes a listing of data fields, upstream data source associated with each data field, and data field transformation information for each data field.

Moreover, in further specific embodiments of the computer program product, the computer-readable medium includes a tenth set of codes for causing a computer to receive a sixth user-input at a second user-interface that selects search character criteria, an eleventh set of codes for causing a computer to receive a seventh user-input at the second user-interface that defines search characters, and a twelfth set of codes for causing a computer to receive an eighth user-input at the second user-input that requests data field search. Additionally, the computer-readable medium includes a thirteenth set of codes for causing a computer to, in response to receiving the eighth user-input, determine data fields that meet the search character criteria and the defined search characters and provide display in the second user-interface of the data fields that meet the search character criteria and the defined search characters. The data fields are displayed according to an associated database.

A method for presenting display of data mapping information provides for third embodiments of the invention. The method includes receiving a first user-input at a first user-interface that selects a data model from amongst a plurality of data models and, in response to receiving the first user-input, providing selectable display in the first user-interface of one or more data extracts associated with the selected data model. In addition, the method includes receiving a second user-input that selects one of the data extracts, and, in response to receiving the second user-input, providing selectable display in the first user-interface of one or more databases associated with the selected data extract. Additionally, the method includes receiving a third user-input that selects one of the databases, and, in response to receiving the third-user input, providing selectable display in the first user-interface of one or more data fields associated with the selected data base. Moreover, the method includes receiving a fourth user-input that selects one of the data field, receiving a fifth user-input that selects a search option, and, in response to receiving the fifth user-input, determining data mapping information for the selected data field and displaying in the first user-interface the data mapping information, which includes at least one table location for the selected data field in other data systems and at least one data field name for the selected data field in the other data systems.

Thus, systems, apparatus, methods, and computer program products herein described in detail below provide for an all-inclusive platform in which users can gain access to data mapping and linkage information associated with multiple data sources, data systems, databases within the systems and the like. As such, embodiments of the present invention provide a time-efficient tool/application that aids the user in comprehending the connections between data from different data sources and included within different data systems and the downstream impact and upstream data source of such data.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
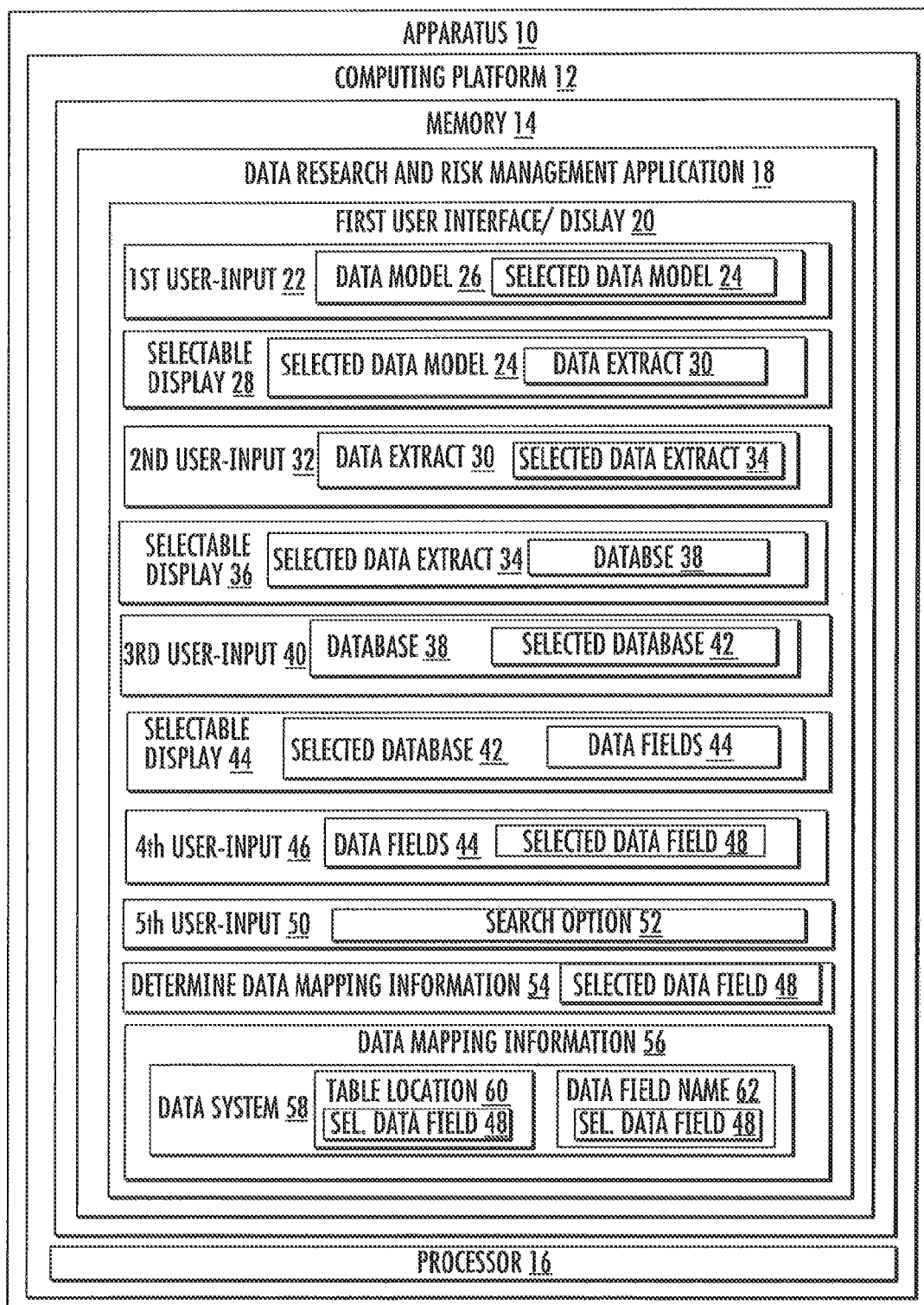
Figure 2:
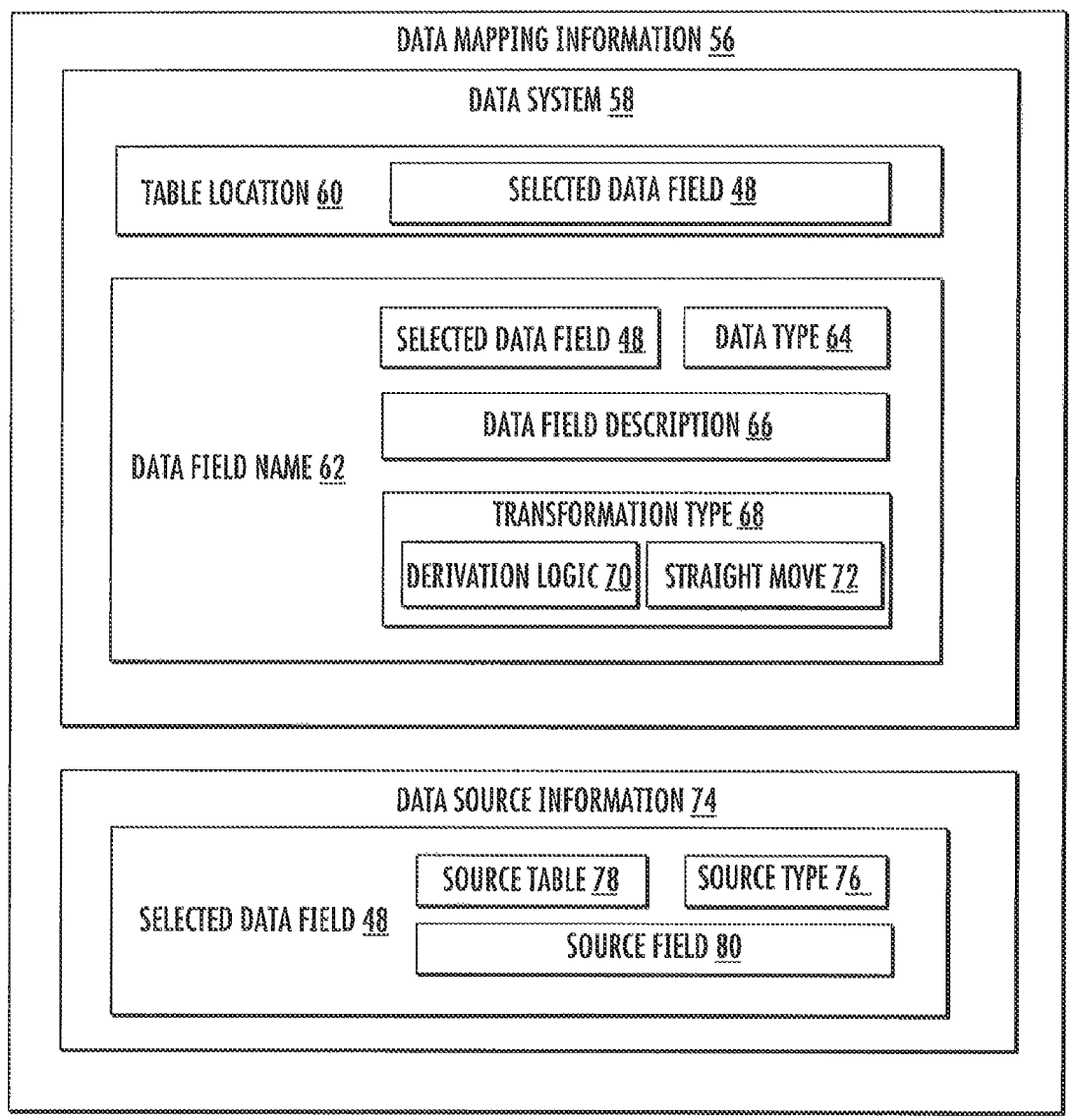
Figure 3:
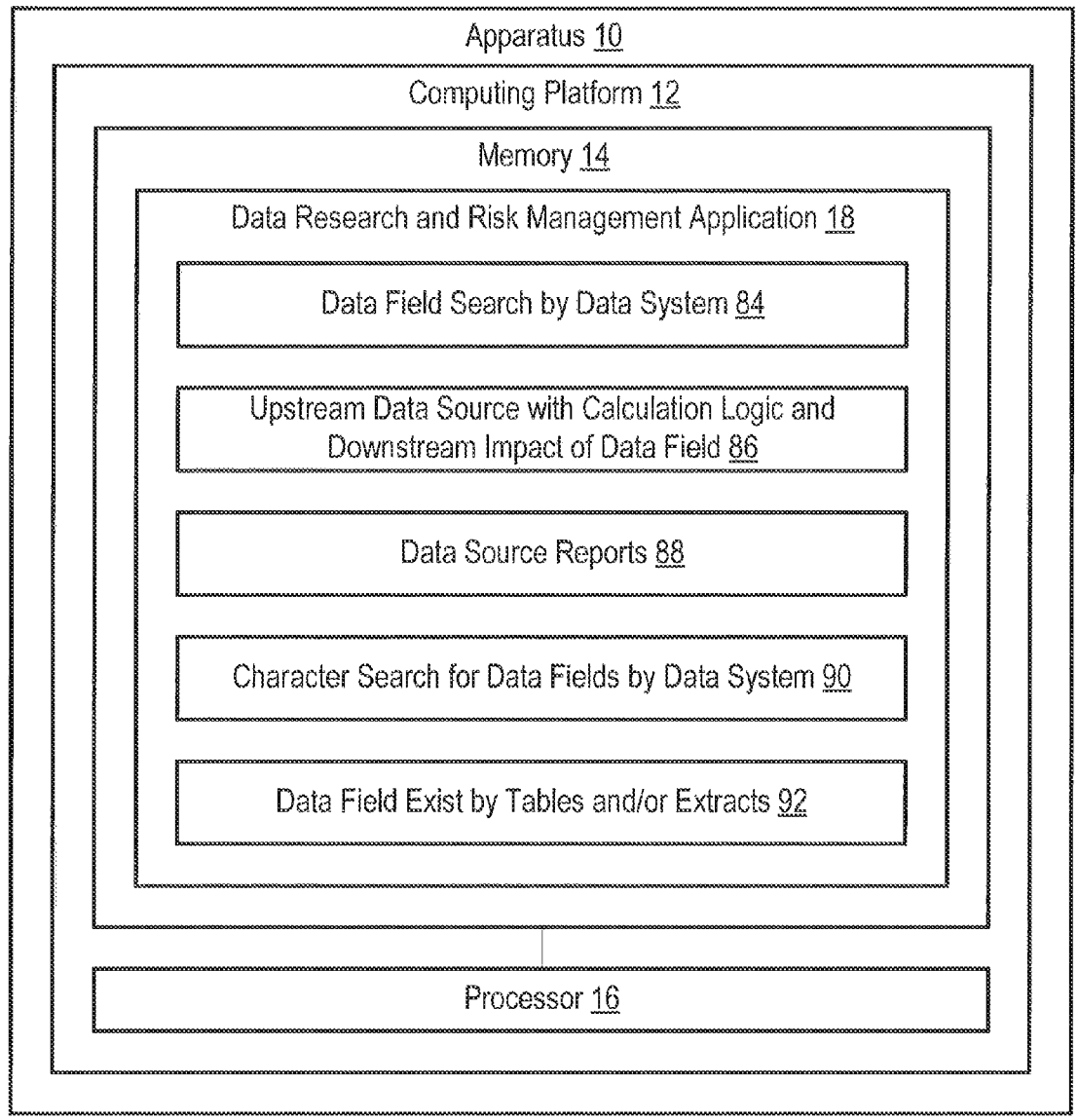
Figure 4:
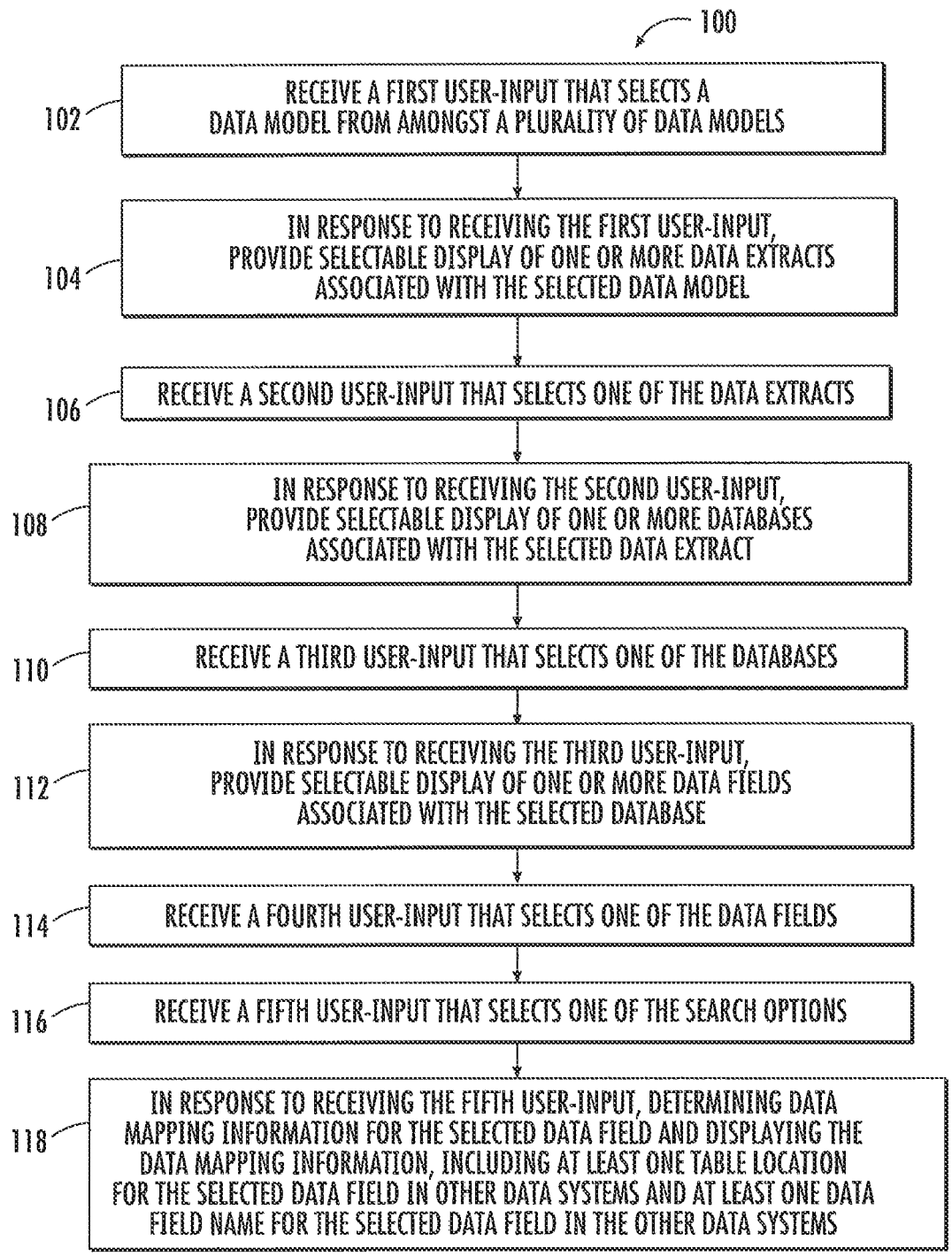
Figure 8A:
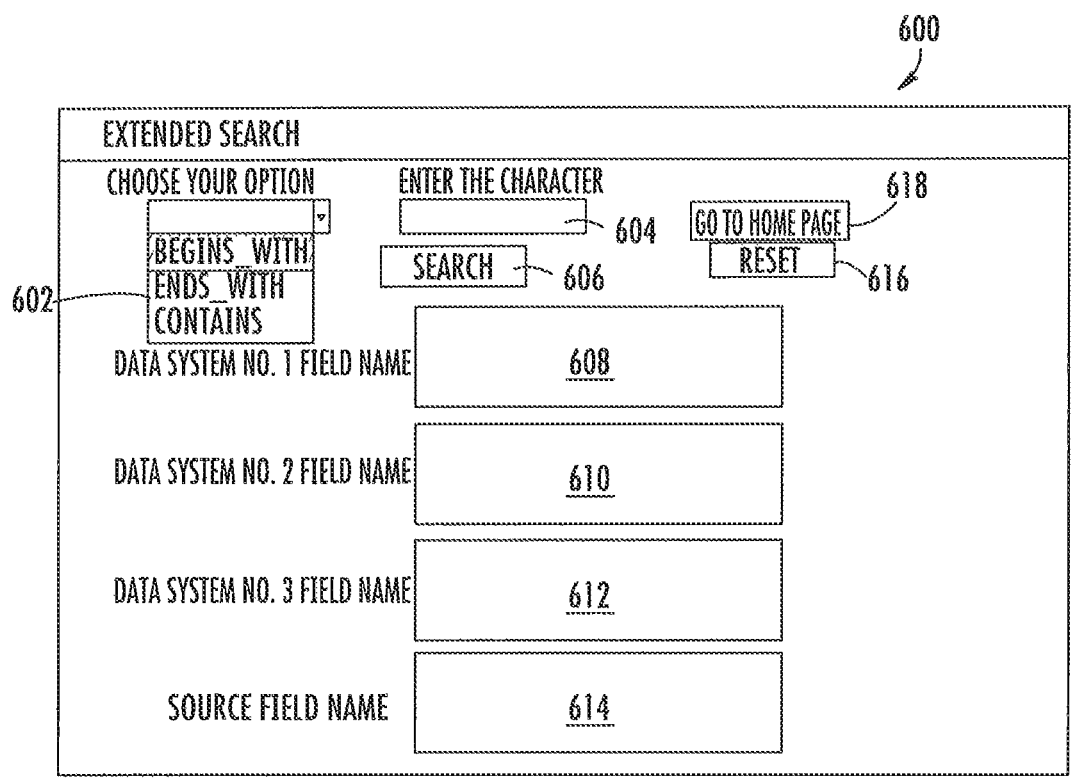
Figure 9A:
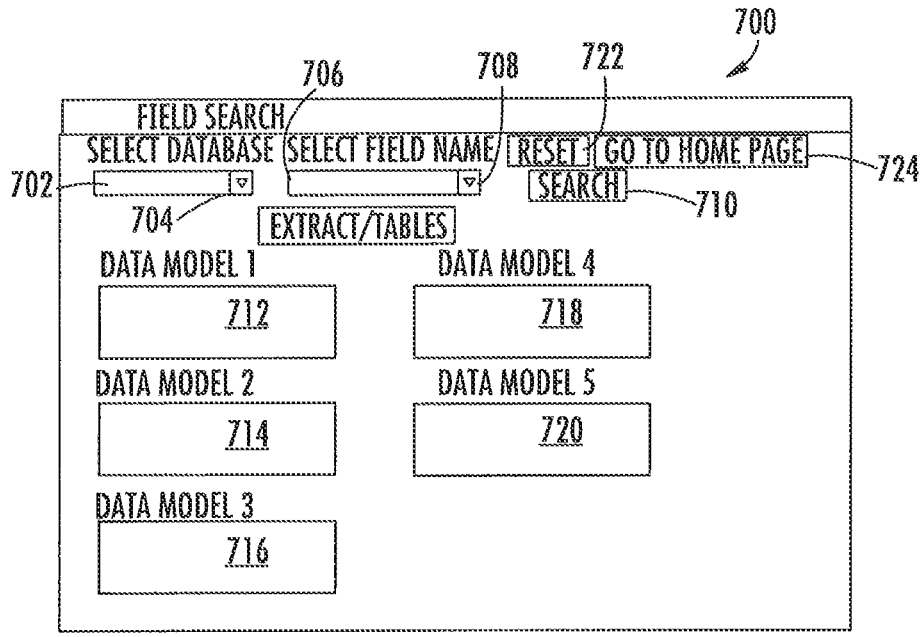
Figure 9B:
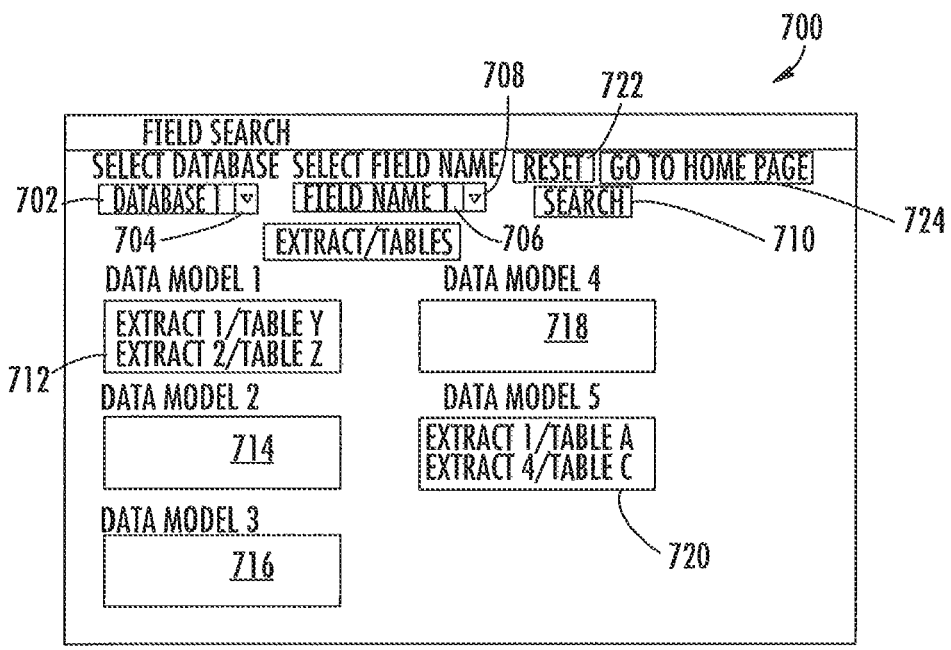

Having thus described embodiments of the invention in general terms, reference will now be made to the accompanying drawings, which are not necessarily drawn to scale, and wherein:

FIG. 1 provides a block diagram of an apparatus configured for providing users access to data mapping and linkage information associated with multiple data sources, data systems and the like, in accordance with embodiments of the present invention;

FIG. 2 provides a more detailed block diagram of the data mapping information that is displayed in response to data field request, in accordance with embodiments of the present invention;

FIG. 3 provides a block diagram of an apparatus highlighting various alternate embodiments for providing users access to data mapping and linkage information associated with multiple data sources, data systems and the like, in accordance with embodiments of the present invention;

FIG. 4 provides a flow diagram of a method for providing users access to data mapping and linkage information associated with multiple data sources, data systems and the like, in accordance with embodiments of the present invention;

FIGS. 5A-5D provides schematic representation of a user-interface configured for providing a user access to data mapping information associated with a specific selected data field, in accordance with embodiments of the present invention;

FIGS. 6A-6D provides a schematic representation of a user-interface for displaying the downstream impact and upstream data source of a selected data field, in accordance with embodiments of the present invention;

FIGS. 7A-7D provides a schematic representation of a user-interface configured for requesting and displaying a comprehensive data field report for a selected data source, in accordance with embodiment of the present invention;

FIGS. 8A-8B provides a schematic representation of a user-interface configured for conducting character searches for data fields, in accordance with embodiments of the present invention; and FIGS. 9A-9B provides a schematic representation of a user-interface configured for providing a user access to extract and table mapping information on a data model basis for a selected data field, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Although some embodiments of the invention described herein are generally described as involving a "financial institution," one of ordinary skill in the art will appreciate that the invention may be utilized by other businesses that take the place of or work in conjunction with financial institutions to perform one or more of the processes or steps described herein as being performed by a financial institution.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as Java, Perl, Smalltalk, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the invention described herein, various systems, apparatus, methods, and computer program products are herein described for a platform that provides dynamic user-access to data mapping information including, but not limited to, the linkages between data sources, data extracts, data systems, databases, tables and the like. By provide such information in an all-inclusive platform the present invention is highly efficient in terms of aiding users in comprehending data connections/links in less time. Moreover, embodiments of the present invention provide users instantaneous access to the downstream impact (i.e., the data is used to calculate one or more data fields) and upstream data sources (i.e., the secondary data fields used to calculate the data) of the data.

Additionally, embodiments of the present invention result in risk reduction, in that, the likelihood of error occurring in data validation is minimized by the platform being capable of succinctly outlining calculation logic used to determine all relevant data fields. In addition, aspects such as the previous mention downstream impact and upstream data sources benefit efficient data research. In addition, the data management application/tool of the present invention provides for multiple different on-demand reporting options, which can be readily tailored based on the current needs and requirements of the user.

Referring to FIG. 1, a block diagram is presented of an apparatus 10 configured for providing user access to data mapping information in response to selecting a specific data field, in accordance with embodiments of the present invention. The apparatus includes a computing platform 12 having a memory 14 and at least one processor 16 in communication with the memory. The apparatus 10 which may include more than one physical device or unit is operable to receive and execute modules, routines and applications, such as data research and risk management application 18 and the like.

The computing platform 12 can receive and execute routines and applications and includes memory 14, which may comprise volatile and nonvolatile memory such as read-only and/or random-access memory (RAM and ROM), EPROM, EEPROM, flash cards, or any memory common to computer platforms. Further, memory 14 may include one or more flash memory cells, or may be any secondary or tertiary storage device, such as magnetic media, optical media, tape, or soft or hard disk.

Further, the computing platform 12 also includes at least one processor 16, which may be an application-specific integrated circuit ("ASIC"), or other chipset, processor, logic circuit, or other data processing device. Processor 16 or other processor such as ASIC may execute an application programming interface ("API") layer (not shown in FIG. 1) that interfaces with any resident programs, such as data research and risk management application 18 and the like, stored in the memory 14 of apparatus 10. Processor 16 includes various processing subsystems (not shown in FIG. 1) embodied in hardware, firmware, software, and combinations thereof, that enable the functionality of apparatus 10 and the operability of the apparatus on a network. For example, processing subsystems allow for initiating and maintaining communications, and exchanging data, with other networked devices. Additionally, processing subsystems may include any portion of the functionality of data research and risk management application 18 obviating the need for such applications and modules to be stored in the memory.

As previously noted, the memory 14 of apparatus 10 stores data research and risk management application 18 that is executable by the processor 16 and configured to provide users access data mapping/linkage information for data originating from various different data sources and stored in various different data systems, databases, tables and the like. An example of the user-interface of such an application is shown and described in relation to FIGS. 5A-5C, infra.

As such, data research and risk management application 18 is configured receive a first user-input 22, within a first user-interface/display 20, that selects a data model 24 from a plurality of data models. Data models may be configured by the enterprise business and may include, but are not limited to, lines-of-business, products and the like. In a financial institution example, the data models may include product/service lines, such as debit/credit cards, loans, investments and the like.

In response to receiving the first user-input 22 that selects the data model 24, the application 18 is configured to provide selectable display 28, within the first user-interface 20, of one or more data extracts 30 associated with the selected data model 24. In this regard the data extracts 30 that are presented in the first user-interface 20 (or accessible from the first user-interface 20 via drop down menu or the like) are dynamically determined and displayed based on the user's selection of the data model 24. As such the data extract 30 may be any data extract associated with the selected data model 24 and used to extract data from a data source associated with the data model 24.

Further, data research and risk management application 18 is configured receive a second user-input 32 that selects a data extract 34 from amongst the one or more data extracts 30. In response to receiving the second user-input 32 that selects the data extract 34, the application 18 is configured to provide selectable display 36, within the first user-interface 20; of one or more databases 38 associated with the selected data extract 34. In this regard the databases 38 that are presented in the first user-interface 20 (or accessible from the first user-interface 20 via drop down menu or the like) are dynamically determined and displayed based on the user's selection of the data extract 34. As such the database 38 may be any database associated with the selected data extract 38.

Additionally, data research and risk management application 18 is configured receive a third user-input 40 that selects a database 42 from amongst the one or more databases 38. In response to receiving the third user-input 40 that selects the database 42, the application 18 is configured to provide selectable display 44, within the first user-interface 20, of a plurality of data fields 44, otherwise referred to as data items or data elements, included in the selected database 42. In this regard, the data fields 44 that are presented in the first user-interface 20 (or accessible from the first user-interface 20 via drop down menu or the like) are dynamically determined and displayed based on the user's selection of the database 42.

Moreover, data research and risk management application 18 is configured receive a fourth user-input 46 that selects a data field 48 from amongst the plurality of data fields 44 and a fifth user-input 50 that selects a search option 52. In response to receiving the fifth user-input 50 that selects the search option 52, the data research and risk management application 18 determines data mapping information 54 associated with the selected data field 48 and provides display of the data mapping information 56 within the first user-interface/display 20.

In specific embodiments of the invention determining data mapping information 54 may rely of extract-based source logic documents (not shown in FIG. 1) that include all of the data fields associated with the extract, and details of each data field, including the links associated with the data field and the rules and logic behind each data field. In specific embodiments of the apparatus 10, the data research and risk management application 18 is configured to display data mapping information 56 that includes table location 60 and data field name 62 of the selected data field 48 within one or more other data systems/databases 58 of the business enterprise. It should be noted that the same data field may have different names in different data systems. For example, in a financial institution scenario, a data field may be named "interest income" in one data system and named "int income" in another data system. For the purpose of data validation it is essential that these different names be cross-references so that the proper data can be accessed and analyzed during the validation process.

Referring to FIG. 2 a block diagram is presented that highlights alternate embodiments of the data mapping information 56 that may additionally be determined and displayed in connection with the data research and risk management application, in accordance with embodiments of the present invention. In addition to the aforementioned table location 60 and data field name 62 of the selected data field 48 within one or more other data systems/databases 58, the data mapping information 56 may include data type 64, data field description 66 and transformation type 68. The data field description 66 may include text that describes the data field in the other data system. Data field description 66 is beneficial so that the user can assess the relation between the selected data field 48 and the linked data field name 62. Transformation type 68 may include indication of a straight move 72 (i.e., no transformation required) or indication of derivation logic 70. In the event derivation logic 70 is used to transform the selected data field to the linked data field name 62, the derivation logic may be shown in the first user-interface 20 or the derivation logic may be accessible from the first user-interface 20 (e.g., hyperlinked text indicating derivation logic 70).

The data mapping information 56 may additionally include data source information 74 for the selected data field. The data source information may include, but is not limited to, the type of data source 76, the data source table 78 and the one or more data source data fields 80 from which the selected data field 48 originated or is derived from.

For specific examples of the data mapping information 56 that may be displayed by the data research and risk management application, see FIGS. 5A-5D and related discussion, infra.

FIG. 3 provides a block diagram of an apparatus 10 configured to store and execute the data research and risk management application 18 of the present invention. Moreover, FIG. 3 highlights various additional functionality of the data research and risk management application 18, in accordance with alternate embodiments of the invention.

As detailed in FIGS. 1 and 2, the data research and risk management application 18 is configured to provide data field search/linkage by data system and data source 84. In addition to providing the link between the selected data field and the data system and/or data source, embodiments provide for providing the user ready-access to the tables within data systems that include the selected data field, the data field name in the other data system(s), the data type and description of the data field name in the other systems and/or the transformation type and/or logic employed to transform to the data field name in the other data system(s). In addition, as previously discussed, data source information for the selected data field may be determined and presented including data source type, table and data field(s).

In addition, the data research and risk management application 18 may include determination and presentation of the upstream data source with calculation logic and downstream impact 86 of a selected data. The upstream data sources(s) are the one or more secondary data sources used to calculate the selected data field and the downstream data impact is where the data is used in calculating other data fields (i.e., the impact of the data on other data fields). For specific examples of the upstream data sources and downstream impact information that may be displayed by the data research and risk management application, see FIGS. 6A-6D and related discussion, infra.

Additionally, the data research and risk management application 18 may include data source report 88 functionality that is configured to allow the user to select an authorized data source and be presented with display of a report that includes details of the data fields that originate from the selected data source. For specific examples of the data source reporting functionality that may be generated by the data research and risk management application, see FIGS. 7A-7D and related discussion, infra.

Data research and risk management application may be further configured to provide character search for data fields by data systems 90. Such that, if the user does not know a specific data field name the user may enter part of the name (i.e., a few characters or the like) and the resulting search may return all of the data fields within respective data systems/databases that include data fields that are responsive to the search criteria (i.e., the part/portion of the data field name or the like). For specific examples of the character data field search functionality that may be included within the data research and risk management application, see FIGS. 8A-8B and related discussion, infra. Moreover, the data research and risk management application 18 may include data field exist by table and extract 92 functionality to determine and display which tables and extracts a selected data field exist in for specified data systems. For specific examples of the table and extract search functionality that may be included within the data research and risk management application, see FIGS. 9A-9B and related discussion, infra.

Referring to FIG. 4, a flow diagram is presented of a method 100 for providing data field mapping information, in accordance with embodiments of the present invention. At Event 102, a first user-input is received that selects a data model from a plurality of data models. Data models may be configured by the enterprise business and may include, but are not limited to, lines-of-business, products and the like. In a financial institution example, the data models may include product/service lines, such as debit/credit cards, loans, investments and the like.

At Event 104, in response to receiving the first user-input that selects the data model, a selectable display is provided, within a first user-interface, of one or more data extracts associated with the selected data model. As previously noted, the data extracts are dynamically determined and displayed based on the user's selection of the data model. At Event 106 a second user-input is received that selects a data extract from amongst the one or more data extracts 30.

At Event 108, in response to receiving the second user-input that selects the data extract, a selectable display is presented, within the first user-interface, of one or more databases associated with the selected data extract. In this regard the databases that are presented are dynamically determined and displayed based on the user's selection of the data extract. At Event 110 a third user-input is received that selects a database from amongst the one or more databases.

At Event 112, in response to receiving the third user-input that selects the database, a selectable display is provided, within the first user-interface, of a plurality of data fields, otherwise referred to as data items or data elements, included in the selected database. In this regard, the data fields that are presented in the first user-interface are dynamically determined and displayed based on the user's selection of the database.

At Event 114 a fourth user-input is received that selects a data field from amongst the plurality of data fields and, at Event 116, a fifth user-input is received that selects a search option. At Event 118, in response to receiving the fifth user-input that selects the search option, data mapping information is determined for the selected data field and display of the data mapping information is provided within the first user-interface/display. The data mapping information may include, but is not limited to, table location and data field name of the selected data field within one or more other data systems/databases of the business enterprise. In other embodiments of the method, the data mapping information may include data type, data field description and transformation type. Transformation type may include indication of a straight move (i.e., no transformation required) or indication of derivation logic. Moreover, the data mapping information may additionally include data source information for the selected data field. The data source information may include, but is not limited to, the type of data source, the data source table and the one or more data source data fields from which the selected data field originated or is derived from.

Referring to FIGS. 5A-5D, an exemplary user-interface 200 is shown for displaying data mapping information of a selected data field, in accordance with embodiments of the present invention. The user-interface includes data model entry field 202 and associated drop down menu key 204, extract entry field 206 and associated drop down menu key 208, database entry field 210 and associated drop down menu key 212 and data field entry field 214 and associated drop down menu key 216. As a means of implementing the application, a user starts by activating down menu key 204 to display the drop down menu of data models. The user then selects a data model from the drop down menu, such as "cards" and the selection is displayed in data model entry field 202. Selection of a data model will dynamically identify the extracts associated with the data model that are displayed when the user activates the drop down key 208 to display the drop down menu 207 of extracts (shown in FIG. 5B).

The user then selects an extract from the drop down menu 207, such as "extract No. 1" and the selection is displayed in extract entry field 206. Selection of an extract will dynamically identify the databases associated with the extract that are displayed when the user activates the drop down key 212 to display a drop down menu of databases. The user selects a database from a drop down menu (not shown in FIGS. 5A-5D), such as "database No. 2" and the selection is displayed in database entry field 210. Selection of a database will dynamically identify the data fields included in the database that are displayed when the user activates the drop down key 216 to display a drop down menu 215 of data fields. The user selects a data field from the drop down menu 215 (shown in FIG. 5C), such as "data field No. 6" and the selection is displayed in data field entry field 214.

The user-interface 200 additionally includes search option key 217 that is activated by the user once the data model, extract, database and data field entry fields 202, 206, 210 and 214 have been populated.

Figures 5A, 5B:
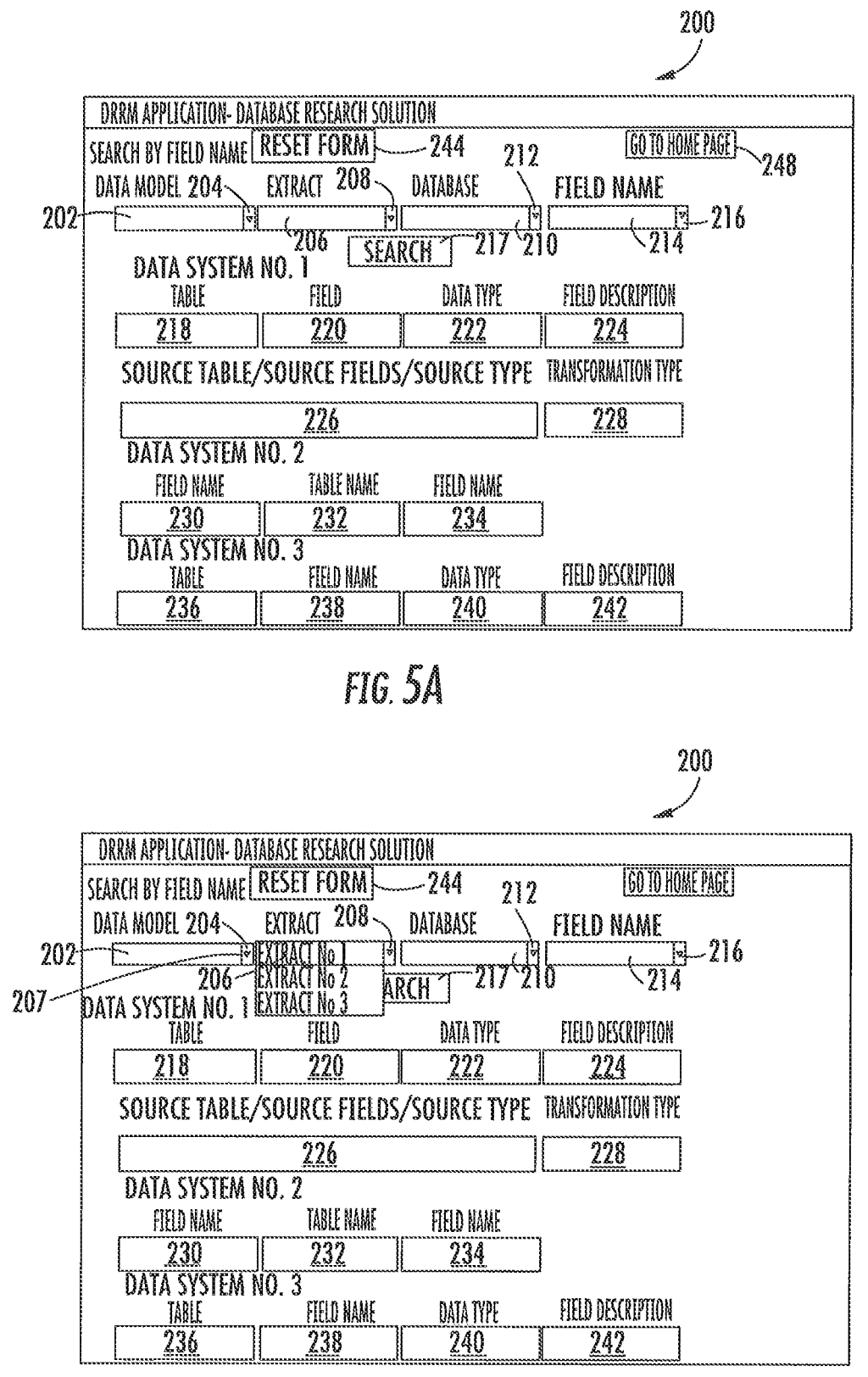
Figures 5C, 5D:
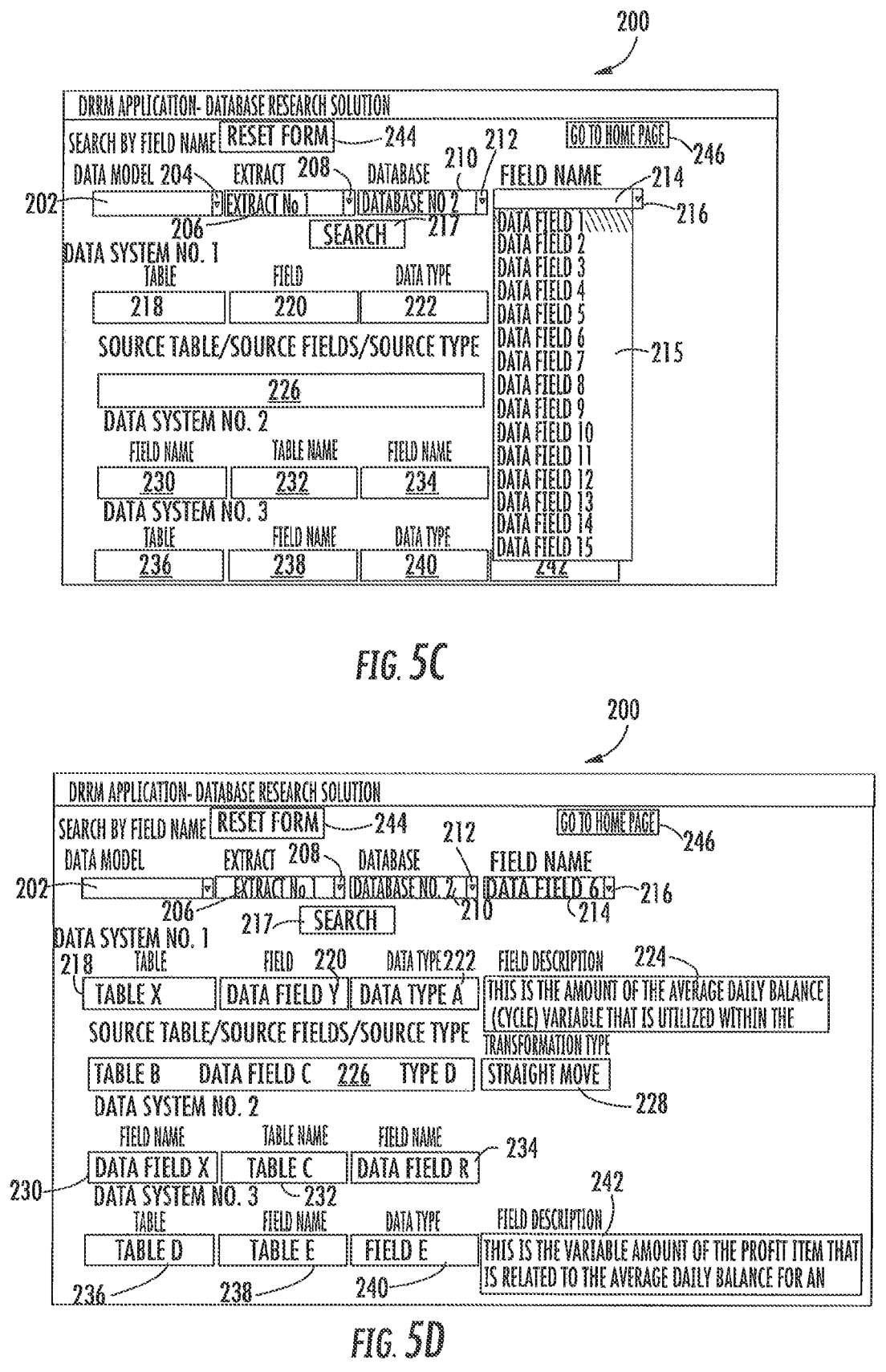

Additionally, user-interface 200 includes data system No. 1 table panel 218, data field panel 220, data type panel 222 and field description panel 224, which may be populated with related data field mapping information associated with data system No. 1 in response to the user activating search option key 217. For example, as shown in FIG. 5D, table panel 218 indicates "Table X", data field panel 220 indicates "Data Field Y", data type panel 222 indicates "Data Type A" and field description panel 224 indicates text that describes the data field indicated in data field panel 220.

In addition, user-interface 200 includes source information panel 226, which may be populated with related data source mapping information in response to the user activating search option key 217. For example, as shown in FIG. 5D, source information panel 226 indicates "Source Table B"/"Source Data Field C"/"Source Type D". Additionally, user-interface 200 includes transformation type panel 228 which may be populated with the transformation type used for transforming the source data field to the selected data field. For example, as shown in FIG. 5D, the transformation type panel 228 may indicate "Straight Move" (i.e., no transformation required) or derivation logic.

Moreover, user-interface 200 includes panels for displaying data mapping information associated with other data systems, such as data system No. 2 data field panel 230; data system No. 3 table panel 232 and data field 234; and data system No. 4 table panel 236, data field panel 238, data type panel 240 and data field description panel 242, which may be populated with related data field mapping information associated with data systems No. 2-4 in response to the user activating search option key 217. For example, as shown in FIG. 5D, data field panel 230 indicates "Data Field X", table panel 232 indicates "Table C", data field panel 234 indicates "Data Field R", table panel 236 indicates "Table D", data field panel 238 indicated "Data Field E", data type window 240 indicated "Data Type F" and field description panel 242 indicates text that describes the data field indicated in data field panel 238.

User-interface 200 additionally includes reset form key 244 that is activated by a user to clear all data entry fields and populated panels and home page key 246 for returning the user to home page to select further functionality or exit the application.

Referring to FIGS. 6A-6D an exemplary user-interface 300 is shown that provides display of upstream data source with calculation and downstream data field impact, in accordance embodiments of the present invention. The user-interface 300 includes data model entry field 302 and associated drop down menu key 304, and data field entry field 306 and associated drop down menu key 308. As a means of implementing the application, a user starts by activating down menu key 302 to display the drop down menu 303 (shown in FIG. 6B) of data models. The user then selects a data model from the drop down menu, such as "Cards" and the selection is displayed in data model entry field 302. Selection of a data model will dynamically identify the data fields associated with the data model that are displayed when the user activates the drop down key 308 to display the drop down menu of data fields (not shown in FIGS. 5A-5D). The user selects a data field from the drop down menu, such as "data field No. 1" and the selection is displayed in data field entry field 306. The user-interface 300 additionally includes search option key 310 that is activated by the user once the data model and data field entry fields 302 and 306 have been populated.

Figure 6A:
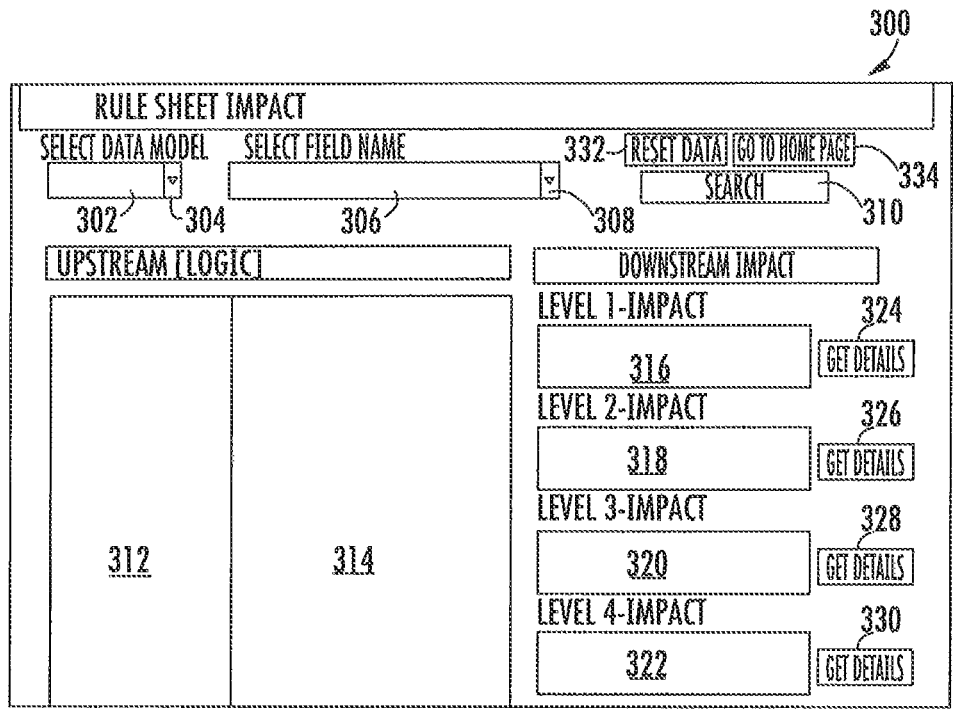
Figure 6B:
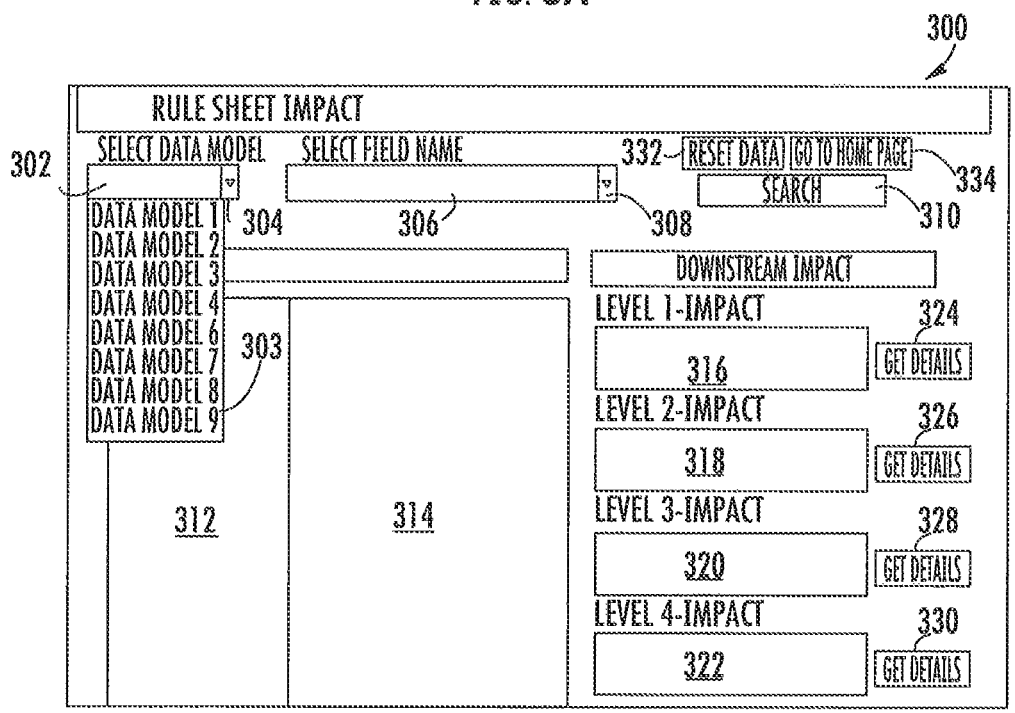
Figure 6C:
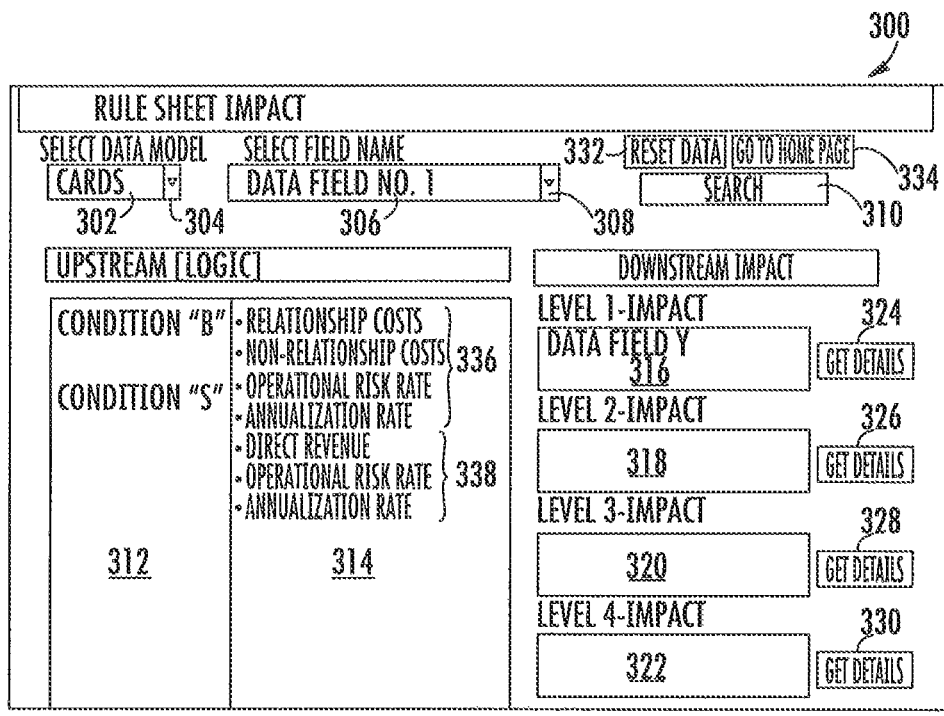
Figure 6D:
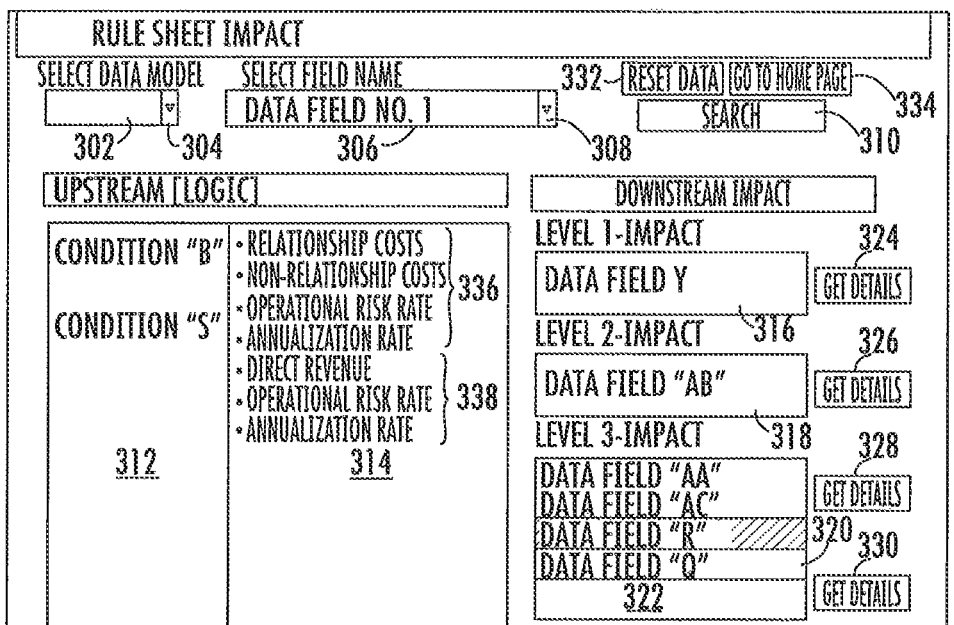

User-interface 300 additionally includes upstream data source panel 312 and upstream calculation logic panel 314, which may be populated with related upstream mapping information (i.e., data fields and calculation logic) associated with the selected data field (e.g., Data Field No. 1) in response to the user activating search option key 310. For example, as shown in FIGS. 6C and 6D, the data field panel 312 indicates upstream data source on "Condition B" and "Condition S" and the calculation logic 314, indicates the secondary data fields (Conditions B and S) used to calculate the selected data field (e.g., Data Field No. 1) and the calculation logic used to calculate/derive the secondary data field.

Moreover, user-interface 300 includes downstream impact panels 316, 318, 320 and 322. Downstream impact panel 316 which indicates first level downstream impact is configured to be populated with the related downstream mapping information (i.e., data fields) associated with the selected data field (e.g., Data Field No. 1) in response to the user activating search option key 310. If the user desires further downstream impact information the user may select a data field displayed in one of the downstream impact panels 316, 318, 320 or 322 and activate an associated "Get Details" key 324, 326, 328 or 330 to populate a next level downstream impact panel 318, 320, 322 or the like with those data fields downstream impacted by the selected data field. In one specific embodiment of the invention, the user-interface 300 is configured to provide for determination and display of up to seven levels of downstream data field impact. For example, as shown in FIG. 6C, the initial level one downstream impact panel 316 indicates downstream impact on "Data Field Y". In FIG. 6D, the user has activated "Get Details" key 324 to indicate in level two downstream impact panel that "Data Field AB" is downstream impacted by Data Field Y and the user has activated "Get Details" key 326 to indicate in level three downstream impact panel that "Data Fields AA, AC, R and Q" are downstream impacted by Data Field AB.

User-interface 300 additionally includes reset form key 332 that is activated by a user to clear all data entry fields and populated panels and home page key 334 for returning the user to home page to select further functionality or exit the application.

Referring to FIGS. 7A-7D shown is a user-interface 400 for request a data source report and an example of a resulting data source report 500, in accordance with embodiments of the invention. The user-interface 400 includes a data source entry field 402 and associated drop down menu key 403, which is activated by a user to display drop down menu 404 of authorized data sources. The user selects a data source from the drop down menu 404 (shown in FIG. 7A), such as "data source No. 1" and the selection is displayed in data source entry field 402. The user-interface 400 additionally includes report key 406 that is activated by the user once the data source entry field 402 has been populated.

Figures 7A, 7B:
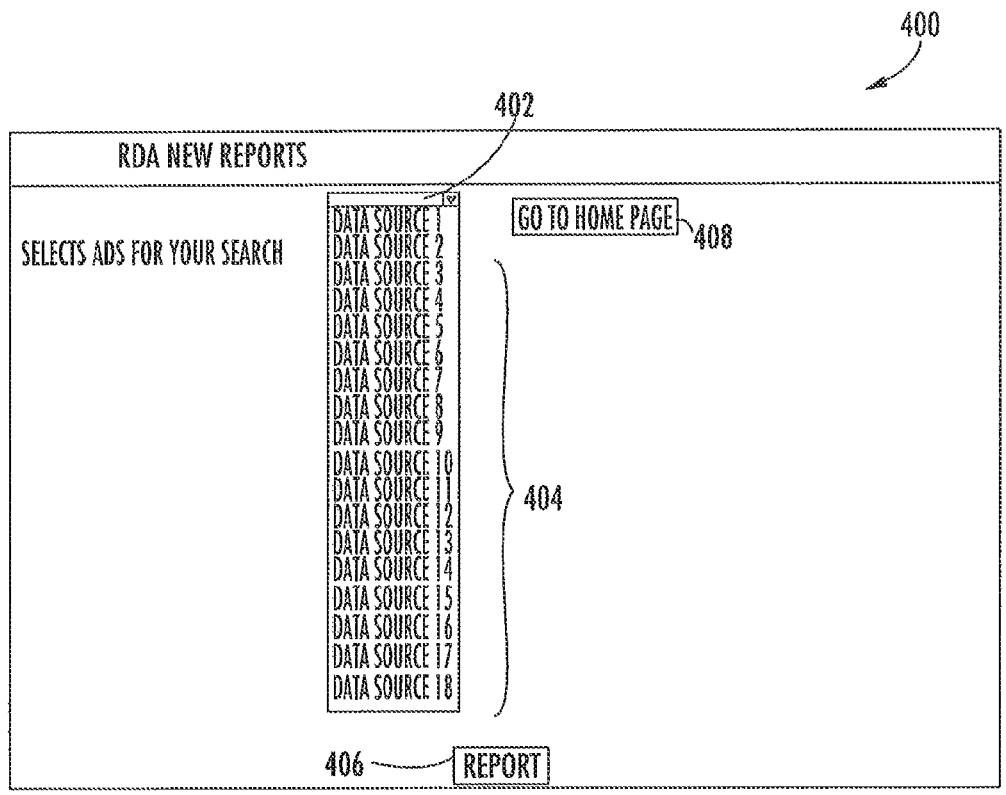

Exemplary report 500 shown in FIGS. 7B-7D is generated and presented in response to the user activating report key 406 of user-interface 400. Example report 500 includes columns (shown in FIG. 7B) for current upstream data source number 502, current upstream data source name 504, current upstream data source application name 506, indication of the data source being manual 508, data element name 510 and data element description 512. Additionally, report 500 includes columns for (shown in FIG. 7C) for maximum value boundaries 514, indication of data element being required 516, indication of the data element being transformed 518. Transformation details/logic 520, indication of a point at which the data transformation occurs 522 and reference data used for aggregation filter or transformation logic 524. Moreover, report 500 includes columns (shown in FIG. 7D) for indication of data being obfuscated and means 528, data type 530 and underlying branch number 532.

Referring to FIGS. 8A-8B a user-interface 600 is depicted for character searching of data fields within specified data systems/databases and data source, in accordance with embodiments of the present invention. The user-interface 600 includes character option drop down menu 602 which includes options for "begins with", "ends with" and "contains". The user-interface 600 additionally includes character entry field 604 configured to receive character/text entry from the user. User-interface 600 additionally includes search option key 606, which is activated by the user once the user has selected a search option from drop down menu 602 and entered appropriate characters in character entry field 604.

User-interface 600 additionally includes data system No. 1 data field panel 608, data system No. 2 data field panel 610, data system No. 3 data field panel 612 and data source data field panel 614, which are operative to display the data fields within the corresponding data system or data source that are responsive to the character option and character entry. For example, in the illustrated embodiment of FIGS. 8A and 8B. the character option is "Contains" and the character entry is "AVG", such that panels 608, 610, 612 and 614 display all data fields within the respective data system or data source that contain the term/phrase, "AVG".

User-interface 600 additionally includes reset key 616 that is activated by a user to clear all data entry fields and populated panels and home page key 618 for returning the user to home page to select further functionality or exit the application.

Lastly, referring to FIGS. 9A-9B a user-interface 700 is shown displaying extracts and tables within specified data models that map to a selected data field, in accordance with embodiments of the present invention. The user-interface 700 includes database entry field 702 and associated drop down menu key 704, and data field entry field 706 and associated drop down menu key 708. As a means of implementing the application, a user starts by activating down menu key 704 to display the drop down menu (not shown in FIGS. 9A-9B) of databases. The user then selects a database from the drop down menu, such as "Database 1" and the selection is displayed in database entry field 702. Selection of a database will dynamically identify the data fields associated with the database that are displayed when the user activates the drop down key 708 to display the drop down menu of data fields (not shown in FIGS. 9A-9B). The user selects a data field from the drop down menu, such as "data field No. 1" and the selection is displayed in data field entry field 706. The user-interface 700 additionally includes search option key 710 that is activated by the user once the database and data field entry fields 702 and 706 have been populated.

The user-interface 700 additionally includes data model No. 1 extract/table panel 712, data model No. 2 extract/table panel 714, data model No. 3 extract/table panel 716, data model No. 4 extract/table panel 718, and data model No. 5 extract/table panel 720, which are configured to display the extracts and tables if the selected data field exists within an extract/table of one or more data models. For example, as shown in FIG. 9B, data model No. 1 extract/table panel 712 indicates that the data field exists in "Extract 1/Table Y" and "Extract 2/Table Z" and data model No. 5 extract/table panel 720 indicates that the data field exists in "Extract 1/Table A" and "Extract 4/Table C".

User-interface 700 additionally includes reset key 722 that is activated by a user to clear all data entry fields and populated panels and home page key 724 for returning the user to home page to select further functionality or exit the application.

Thus, systems, apparatus, methods, and computer program products described above provide for a comprehensive platform in which users can gain access to data mapping and linkage information associated with multiple data sources, data systems, databases within the systems and the like. As such, the platform provides for time-efficient and reliable data management, data research and data validation, which aids the user in comprehending the connections between data from different data sources and included within different data systems. In addition, the data management platform provides for dynamic access to the downstream impact (i.e., the data is used to calculate one or more data sources/fields) and upstream data sources and calculation logic (i.e., the secondary data sources used to calculate the data) impacts of such data.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. An apparatus for presenting display of data mapping information, the system comprising:
   a computing platform having a memory and at least one processor in communication with the memory;
   a data research and risk management application stored in the memory, executable by the processor and configured to:
      receive a first user-input at a first user-interface that selects a data model from amongst a plurality of data models;
      in response to receiving the first user-input, provide selectable display in the first user-interface of one or more data extracts associated with the selected data model, wherein the one or more data extracts are dynamically determined and displayed based on the user's selection of the data model;
      receive a second user-input that selects a data extract from the one or more data extracts;
      in response to receiving the second user-input, provide selectable display in the first user-interface of one or more databases associated with the selected data extract, wherein the one or more databases are dynamically determined and displayed based on the user's selection of the data extract;
      receive a third user-input that selects a database from the one or more databases;
      in response to receiving the third-user input, provide selectable display in the first user-interface of one or more data fields associated with the selected database, wherein the one or more data fields are dynamically determined and displayed based on the user's selection of the database;
      receive a fourth user-input that selects a data field from the one or more data fields;
      receive a fifth user-input that selects a search option; and
      in response to receiving the fifth user-input, determine data mapping information for the selected data field and display in the first user-interface the data mapping information, the data mapping information including at least one table location for the selected data field in other data systems and at least one data field name for the selected data field in the other data systems.

2. The apparatus of claim 1, wherein the data research and risk management application is further configured to determine the data mapping information for the selected data field and display the data mapping information, the data mapping information including a data type for the data field name in the other data systems and a data field description for the data field name in the other data system.

3. The apparatus of claim 1, wherein the data research and risk management application is further configured to determine the data mapping information for the selected data field and display the data mapping information, the data mapping information including transformation type required to transform the selected data field to the data field name in the other data system, wherein the transformation type includes one of no transformation required or derivation logic required to transform the selected data field to the data field name in the other data system.

4. The apparatus of claim 1, wherein the data research and risk management application is further configured to (1) receive a sixth user-input at a second user-interface that selects a data model from amongst a plurality of data models, (2) in response to receiving the sixth user-input, provide selectable display in the second user-interface of one or more data fields associated with the selected data model, (6) receive a seventh user-input that selects a search option, and (7) in response to receiving the seventh user-input, determine upstream data source and downstream database impact of the selected data field and provide display in the second user-interface of the upstream data source and downstream database impact.

5. The apparatus of claim 4, wherein the data research and risk management application is further configured to determine upstream data source and downstream database impact of the selected data field and provide display in the second user-interface of the upstream data source and downstream database impact, wherein the upstream data source includes one or more data field used to calculate the selected data field and a calculation for deriving each of the one or more data fields.

6. The apparatus of claim 4, wherein the data research and risk management application is further configured to determine upstream data source and downstream database impact of the selected data field and provide display in the second user-interface of the upstream data source and downstream database impact, wherein the downstream database impact includes one or more secondary data fields impacted by the selected data field.

7. The apparatus of claim 6, wherein the data research and risk management application is further configured to (1) receive an eighth user-input that selects one of the secondary data fields, (2) receive a ninth user-input that requests downstream database impact of the secondary data field, and (3) in response to receiving the ninth user-input, determine downstream database impact of the secondary data field including one or more tertiary data fields impacted by the secondary data field.

8. The apparatus of claim 1, wherein the data research and risk management application is further configured to (1) receive a sixth user-input at a second user-interface that selects a data source, (2) receive a seventh user-input at the second user-interface that requests a report for the selected data source, and (3) in response to receiving the seventh user-input, generate and present the report in a third user-interface, wherein the report includes a listing of data fields, upstream data source associated with each data field and data field transformation information for each data field.

9. The apparatus of claim 1, wherein the data research and risk management application is further configured to (1) receive a sixth user-input at a second user-interface that selects search character criteria, (2) receive a seventh user-input at the second user-interface that defines search characters, (3) receive an eighth user-input at the second user-input that requests data field search, and (4) in response to receiving the eighth user-input, determine data fields that meet the search character criteria and the defined search characters and provide display in the second user-interface of the data fields that meet the search character criteria and the defined search, wherein the data fields are displayed according to an associated database.

10. The apparatus of claim 1, wherein the data research and risk management application is further configured to (1) receive a sixth user-input at a second user-interface that selects a database, (2) in response to receiving the sixth user-input, provide selectable display in the second of a plurality of data fields associated with the selected database, (3) receive a seventh user-input at the second user-interface that selects one of the data fields associated with the selected database, (4) receive an eighth user-input at the second user-interface that requests data extracts and tables associated with the selected data field, and (5) in response to receiving the eighth user-input, determine and provide display in the second-user-interface of data extracts and tables using the selected data field, wherein the data extracts and tables are displayed according to data model.

11. A computer program product comprising:
a non-transitory computer-readable medium comprising:
a first set of codes for causing a computer to receive a first user-input at a first user-interface that selects a data model from amongst a plurality of data models;
a second set of codes for causing a computer to, in response to receiving the first user-input, provide selectable display in the first user-interface of one or more data extracts associated with the selected data model, wherein the one or more data extracts are dynamically determined and displayed based on the user's selection of the data model;
a third set of codes for causing a computer to receive a second user-input that selects a data extract from the one or more data extracts;
a fourth set of codes for causing a computer to, in response to receiving the second user-input, provide selectable display in the first user-interface of one or more databases associated with the selected data extract, wherein the one or more databases are dynamically determined and displayed based on the user's selection of the data extract;
a fifth set of codes for causing a computer to receive a third user-input that selects database from the one or more databases;
a sixth set of codes for causing a computer to, in response to receiving the third-user input, provide selectable display in the first user-interface of one or more data fields associated with the selected database, wherein the one or more data fields are dynamically determined and displayed based on the user's selection of the database;
a seventh set of codes for causing a computer to receive a fourth user-input that selects a data field from the one or more data fields;

an eighth set of codes for causing a computer to receive a fifth user-input that selects a search option; and
a ninth set of codes for causing a computer to, in response to receiving the fifth user-input, determine data mapping information for the selected data field and display in the first user-interface the data mapping information, the mapping information including at least one table location for the selected data field in other data systems and at least one data field name for the selected data field in the other data systems.

12. The computer program product of claim 11, wherein the ninth set of codes is further configured to cause the computer to determine the data mapping information for the selected data field and display the data mapping information, the mapping information including a data type for the data field name in the other data systems and a data field description for the data field name in the other data system.

13. The computer program product of claim 11, wherein the ninth set of codes is further configured to cause the computer to determine the data mapping information for the selected data field and display the data mapping information, the mapping information including transformation type required to transform the selected data field to the data field name in the other data system, wherein the transformation type includes one of no transformation required or derivation logic required to transform the selected data field to the data field name in the other data system.

14. The computer program product of claim 11, wherein the computer-readable medium further comprises:
a tenth set of codes for causing a computer to receive a sixth user-input at a second user-interface that selects a data model from amongst a plurality of data models;
an eleventh set of codes for causing a computer to, in response to receiving the sixth user-input, provide selectable display in the second user-interface of one or more data fields associated with the selected data model;
a twelfth set of codes for causing a computer to receive a seventh user-input that selects a search option; and
a thirteenth set of codes for causing a computer to, in response to receiving the seventh user-input, determine upstream data source and downstream database impact of the selected data field and provide display in the second user-interface of the upstream data source and downstream database impact.

15. The computer program product of claim 14, wherein the thirteenth set of codes is further configured to cause the computer to determine upstream data source and downstream database impact of the selected data field and provide display in the second user-interface of the upstream data source and downstream database impact, wherein the upstream data source includes one or more data fields used to calculate the selected data field and a calculation a calculation for deriving each of the one or more data fields.

16. The computer program product of claim 14, wherein the thirteenth set of codes is further configured to cause the computer to determine upstream data source and downstream database impact of the selected data field and provide display in the second user-interface of the upstream data source and downstream database impact, wherein the downstream database impact includes one or more secondary data fields impacted by the selected data field.

17. The computer program product of claim 16, wherein the computer-readable medium further comprises:
a fourteenth set of codes for causing a computer to receive an eighth user-input that selects one of the secondary data fields;

a fifteenth set of codes for causing a computer to receive a ninth user-input that requests downstream database impact of the secondary data field; and a sixteenth set of codes for causing a computer to, in response to receiving the ninth user-input, determine downstream database impact of the secondary data field including one or more tertiary data fields impacted by the secondary data field.

18. The computer program product of claim 11, wherein the computer-readable medium further comprises:

a tenth set of codes for causing a computer to receive a sixth user-input at a second user-interface that selects a data source;

an eleventh set of codes for causing a computer to receive a seventh user-input at the second user-interface that requests a report for the selected data source; and a twelfth set of codes for causing a computer to, in response to receiving the seventh user-input, generate and present the report in a third user-interface, wherein the report includes a listing of data fields, upstream data source associated with each data field and data field transformation information for each data field.

19. The computer program product of claim 11, wherein the computer-readable medium further comprises:

a tenth set of codes for causing a computer to receive a sixth user-input at a second user-interface that selects search character criteria;

an eleventh set of codes for causing a computer to receive a seventh user-input at the second user-interface that defines search characters;

a twelfth set of codes for causing a computer to receive an eighth user-input at the second user-input that requests data field search; and a thirteenth set of codes for causing a computer to, in response to receiving the eighth user-input, determine data fields that meet the search character criteria and the defined search characters and provide display in the second user-interface of the data fields that meet the search character criteria and the defined search, wherein the data fields are displayed according to an associated database.

20. A method for presenting display of data mapping information, the method comprising:

receiving, by a computing device processor, a first user-input at a first user-interface that selects a data model from amongst a plurality of data models;

in response to receiving the first user-input, providing, by a computing device processor, selectable display in the first user-interface of one or more data extracts associated with the selected data model, wherein the one or more data extracts are dynamically determined and displayed based on the user's selection of the data model;

receiving, by a computing device processor, a second user-input that selects a data extract from the one or more data extracts;

in response to receiving the second user-input, providing, by a computing device processor, selectable display in the first user-interface of one or more databases associated with the selected data extract, wherein the one or more databases are dynamically determined and displayed based on the user's selection of the data extract receiving, by a computing device processor, a third user-input that selects a database from the one or more databases;

in response to receiving the third-user input, providing, by a computing device processor, selectable display in the first user-interface of one or more data fields associated with the selected database, wherein the one or more data fields are dynamically determined and displayed based on the user's selection of the database;

receiving, by a computing device processor, a fourth user-input that selects data field from the one or more data fields;

receiving, by a computing device processor, a fifth user-input that selects a search option; and in response to receiving the fifth user-input, determining, by a computing processor, data mapping information for the selected data field and displaying in the first user-interface the data mapping information, the data mapping information including at least one table location for the selected data field in other data systems and at least one data field name for the selected data field in the other data systems.

* * * * *